(12) United States Patent
Nogi et al.

(10) Patent No.: US 12,347,870 B2
(45) Date of Patent: Jul. 1, 2025

(54) METHOD FOR MANUFACTURING CATALYST INK FOR FUEL CELL ELECTRODE

(71) Applicant: TOYOTA JIDOSHA KABUSHIKI KAISHA, Toyota (JP)

(72) Inventors: Atsushi Nogi, Toyota (JP); Takanori Kajihara, Toyota (JP); Fumito Tomimasu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 472 days.

(21) Appl. No.: 17/820,333

(22) Filed: Aug. 17, 2022

(65) Prior Publication Data
US 2023/0072339 A1    Mar. 9, 2023

(30) Foreign Application Priority Data
Aug. 31, 2021    (JP) .................. 2021-141176

(51) Int. Cl.
| | |
|---|---|
| *H01M 4/86* | (2006.01) |
| *B01F 27/90* | (2022.01) |
| *B01F 35/53* | (2022.01) |
| *B01J 21/18* | (2006.01) |
| *B01J 37/04* | (2006.01) |
| *H01M 4/88* | (2006.01) |
| *H01M 4/90* | (2006.01) |

(52) U.S. Cl.
CPC .......... *H01M 4/8663* (2013.01); *B01F 27/90* (2022.01); *B01F 35/53* (2022.01); *B01J 21/18* (2013.01); *B01J 37/04* (2013.01); *H01M 4/881* (2013.01); *H01M 4/8828* (2013.01); *H01M 4/90* (2013.01)

(58) Field of Classification Search
CPC .................................................. H01M 4/8663
See application file for complete search history.

(56) References Cited

U.S. PATENT DOCUMENTS

2014/0205932 A1    7/2014    Hori et al.

FOREIGN PATENT DOCUMENTS

| JP | 2013158741 A | 8/2013 |
|---|---|---|
| JP | 5880562 B2 | 2/2016 |

(Continued)

OTHER PUBLICATIONS

JP 2007-125454translation (Year: 2007).*

*Primary Examiner* — Brian R Ohara
(74) *Attorney, Agent, or Firm* — Dickinson Wright, PLLC (57) ABSTRACT

There is provided a method for manufacturing a catalyst ink for fuel cell electrodes that allows simultaneously performing fineness of a catalyst and adjustment of viscosity of the catalyst ink. The method for manufacturing a catalyst ink for fuel cell electrodes containing a catalyst, a solvent, and an ionomer includes stirring and mixing the catalyst, the solvent, and the ionomer by a high-shear thin-film spin mixer. The ionomer contains a gel-like ionomer. The high-shear thin-film spin mixer includes a cylindrical stirring tank, a rotary vane, and a shaft. The cylindrical stirring tank has unevennesses on an inner peripheral surface. The rotary vane is concentric with the stirring tank and has an outer diameter slightly smaller than an inner diameter of the stirring tank. The shaft includes the rotary vane on an end portion and is rotatable at high speed in forward and reverse directions.

3 Claims, 8 Drawing Sheets

(56) References Cited

FOREIGN PATENT DOCUMENTS

| | | |
|---|---|---|
| JP | 2016024888 A | 2/2016 |
| JP | 2019087306 A | 6/2019 |
| JP | 2019204760 A | 11/2019 |
| WO | 2013/031060 A1 | 3/2013 |

* cited by examiner

METHOD FOR MANUFACTURING CATALYST INK FOR FUEL CELL ELECTRODE

CROSS REFERENCE TO RELATED APPLICATIONS

The present application claims priority from Japanese patent application JP 2021-141176 filed on Aug. 31, 2021, the entire content of which is hereby incorporated by reference into this application.

BACKGROUND

Technical Field

The present disclosure relates to a method for manufacturing a catalyst ink for fuel cell electrodes.

Description of Related Art

A solid polymer fuel cell, which is a fuel cell that generates electricity using an electrochemical reaction between a fuel gas and an oxidant gas, has attracted attention as an energy source. For the solid polymer fuel cell, generally, a membrane electrode assembly ("fuel electrode-solid polymer electrolyte membrane-air electrode") (also referred to as a MEA) formed by assembling electrodes (an air electrode and a fuel electrode) formed of catalyst layers to respective both surfaces of a solid polymer electrolyte as an electrolyte membrane is used.

The electrodes are each formed of the catalyst layer, and the catalyst layer is a layer that causes an electrode reaction by an electrode catalyst contained in the catalyst layer. Since a three-phase interface in which three phases of an electrolyte, a catalyst, and a reaction gas coexist is necessary for the progress of the electrode reaction, the catalyst layer is generally formed of a layer containing a catalyst (here, the catalyst includes meaning of, for example, not only the catalyst acting alone, but also a metal catalyst supported on a carrier (also referred to as a "metal-supported catalyst" in this specification or the like) and an electrolyte.

In the membrane electrode assembly, each electrode is formed by applying a catalyst ink over the surface of the electrolyte membrane and drying it. The catalyst ink contains a catalyst, an electrolyte having proton ($H^+$) conductivity, and a dispersing solvent (also simply referred to as a "solvent" in this specification or the like) that disperses the catalyst and the electrolyte.

Various studies on catalyst inks have been made. For example, WO 2013/031060 A1 discloses a method for manufacturing a catalyst ink used for formation of a catalyst electrode. The manufacturing method includes steps of: (a) dispersing catalyst-supported particles as conductive particles with a catalyst supported thereon in a solvent to prepare a catalyst dispersion; (b) mixing an ionomer with a volatile solvent to prepare a gel material; and (c) stirring and mixing the catalyst dispersion with the gel material to produce a catalyst ink.

JP 2013-158741 A discloses a fluid mixing device as a mixing device to manufacture a catalyst paste. The fluid mixing device mixes a plurality of fluids while causing shear force to act on the plurality of fluids. The fluid mixing device includes a first mixing element, a second mixing element, and a flow passage shape variable mechanism. The first mixing element has an uneven surface. The second mixing element has an uneven surface. The second mixing element is disposed such that the uneven surface in the first mixing element is opposed to the uneven surface in the second mixing element one another. The flow passage shape variable mechanism changes a shape of a flow passage formed between the first mixing element and the second mixing element and through which the plurality of fluids flow.

SUMMARY

In production of a catalyst ink for fuel cell electrodes (also simply referred to as "catalyst ink" in this specification or the like), fining the catalyst contained in the catalyst ink is required to improve performance and durability of a fuel cell. This is because the adsorption of the catalyst after the fining to an ionomer increases three-phase interfaces contributing to catalyst performance when a catalyst layer is formed.

Furthermore, adjusting viscosity of a catalyst ink is also required for intermittent die coating. To adjust the viscosity of the catalyst ink to be an optimal viscosity, usually, to increase the viscosity of the catalyst ink, pulverization of a gel-like ionomer contained in the catalyst ink is necessary.

Generally, such (i) fineness of the catalyst and (ii) adjustment of the viscosity of the catalyst ink, that is, pulverization of the gel-like ionomer are each performed in different steps.

However, performing (i) fineness of the catalyst and (ii) adjustment of the viscosity of the catalyst ink separately is not preferred from the aspects of time, complicated steps, a cost phase, and the like.

Accordingly, the present disclosure provides a method for manufacturing a catalyst ink for fuel cell electrodes that allows simultaneously performing (i) fineness of the catalyst and (ii) adjustment of the viscosity of the catalyst ink.

The reason that (i) fineness of the catalyst and (ii) adjustment of the viscosity of the catalyst ink are separately performed is that the catalyst and a gel-like ionomer differ in, for example, a physical property and a configuration of aggregation, and thus respective optimal pulverization conditions are different.

For example, in WO 2013/031060 A1, (i) fineness of the catalyst is performed in the step (a) preparation of the catalyst dispersion, and (ii) adjustment of the viscosity of the catalyst ink is performed in the step (c) stirring and mixing the catalyst dispersion with the gel material (the gel-like ionomer).

A disperser in the step (a), for example, an ultrasonic disperser fines the hard catalyst but cannot pulverize the soft gel-like ionomer (that is, the viscosity of the catalyst ink is not increased). Meanwhile, a stirring device in the step (c) in WO 2013/031060 A1, for example, a thin-film spin mixer pulverizes the soft gel-like ionomer but cannot fine the hard catalyst.

Specifically, the reason that the soft gel-like ionomer cannot be pulverized in the step (a) is that the step (a) is the step for pulverizing an aggregate of a hard catalyst, for example, a pigment substance, such as a carbon. That is, the ultrasonic disperser that can be used in the step (a) crushes a target by an impact wave generated by cavitation into a submicron level required for a fuel cell. Therefore, it is considered that the ultrasonic disperser cannot efficiently stretch or pulverize the gel-like organic substance, which is the target possibly required to be stretched and fined by application of shear force. Even when the gel-like organic substance can be pulverized in the step (a), it takes considerable time.

Meanwhile, the reason that the hard catalyst cannot be fined in the step (c) is that the step (c) is the step to pulverize a soft gel-like organic substance, for example, a gel-like ionomer. That is, while the thin-film spin mixer that can be used in the step (c) pulverizes the gel-like organic substance by shear force, the device has a limit of a mechanical clearance of several millimeters, and therefore cannot pulverize the hard catalyst into a desired size, namely, the submicron level.

Furthermore, when a material having a large specific surface area and a high aggregating property is used as the material used for the catalyst, for example, the carrier of the catalyst, (ii) adjustment of the viscosity of the catalyst ink may cause the catalyst to be aggregated conversely and then the particle size of the catalyst may be increased. That is, to maintain the fined state of the catalyst, that is, to suppress reaggregation of the catalyst, adsorption of a dispersing agent to the catalyst was important.

For example, it has been found that when the catalyst carrier that easily aggregates, for example, the carrier in which carbon has high crystallinity (the carrier having a high graphite property) is used for the catalyst, the catalyst reaggregates in a case where a mass ratio of the ionomer to the carbon in the catalyst (=the mass of ionomer/the mass of carbon in the catalyst) is less than 0.3 even using the ionomer as the dispersing agent.

Accordingly, it has been found that the material used for the catalyst ink also possibly affects the respective steps of (i) fineness of the catalyst and (ii) adjustment of the viscosity of the catalyst ink.

Therefore, as the result of variously examining means to solve the problems, the inventors have found that, in a method for manufacturing a catalyst ink for fuel cell electrodes containing a catalyst, a solvent, and an ionomer, stirring and mixing the catalyst, the solvent, and a gel-like ionomer by a specific high-shear thin-film spin mixer was able to pulverize the catalyst, in addition to the gel-like ionomer, and thus the present disclosure has been completed.

That is, the gist of the present disclosure is as follows.
(1) A method for manufacturing a catalyst ink for fuel cell electrodes containing a catalyst, a solvent, and an ionomer. The method comprises stirring and mixing the catalyst, the solvent, and the ionomer by a high-shear thin-film spin mixer. The ionomer contains a gel-like ionomer. The high-shear thin-film spin mixer includes a cylindrical stirring tank, a rotary vane, and a shaft. The cylindrical stirring tank has unevennesses on an inner peripheral surface thereof. The rotary vane is concentric with the stirring tank and has an outer diameter slightly smaller than an inner diameter of the stirring tank. The shaft includes the rotary vane on an end portion thereof and is rotatable at high speed in forward and reverse directions.
(2) The method according to (1) in which the gel-like ionomer has high oxygen permeability.
(3) The method according to (1) or (2) in which the ionomer further contains a solution-like ionomer.
(4) The method according to any one of (1) to (3) in which the catalyst contains a carbon, the ionomer further contains a solution-like ionomer, and a content of the solution-like ionomer is from 0 pts.mass to 20 pts.mass when a content of the carbon in the catalyst is defined as 100 pts.mass.
(5) A method for manufacturing a fuel cell comprises applying a catalyst ink for fuel cell electrodes obtained by the method according to any one of (1) to (4) over a solid polymer electrolyte by a die coating method to form a fuel cell electrode.

The present disclosure provides a method for manufacturing a catalyst ink for fuel cell electrodes that allows simultaneously performing (i) fineness of the catalyst and (ii) adjustment of the viscosity of the catalyst ink.

DETAILED DESCRIPTION OF THE EMBODIMENTS

The following describes appropriate embodiments of the present disclosure in detail.

In this specification, features of the present disclosure will be described with reference to the drawings as necessary. In the drawings, dimensions and shapes of respective components are exaggerated for clarification, and actual dimensions and shapes are not accurately illustrated. Accordingly, the technical scope of the present disclosure is not limited to the dimensions or the shapes of the respective components illustrated in the drawings. Note that, a method for manufacturing a catalyst ink for fuel cell electrodes of the present disclosure is not limited to the embodiments below, and can be performed in various configurations where changes, improvements, and the like that a person skilled in the art can make are given within the scope not departing from the gist of the present disclosure.

The present disclosure is a method for manufacturing a catalyst ink for fuel cell electrodes containing a catalyst, a solvent, and an ionomer, the method including a step of stirring and mixing the catalyst, the solvent, and the ionomer containing a gel-like ionomer by a specific high-shear thin-film spin mixer.

Here, as the catalyst, the catalyst known in the technical field can be used, and the catalyst is not limited. As the catalyst, for example, a metal-supported catalyst can be used. In the metal-supported catalyst, a metal catalyst is supported on a carrier.

As the carrier, the carrier known in the technical field can be used, and the carrier is not limited. As the carrier, a solid carbon carrier, a hollow carbon carrier, a high crystal carbon carrier, and the like can be used. For example, a carbon material, such as a carbon black, for example, an acetylene black type carbon black (for example, Ketjen), a furnace black type carbon black (for example, Vulcan), a carbon nanotube, and a carbon nanofiber, a carbon compound, such as a silicon carbide, a mixture of them, and the like can be used. The acetylene black type carbon black is used as the carrier in some embodiments.

The carrier having a large surface area and where nano-sized metal catalyst is distributed into the surface is used in some embodiments.

The BET specific surface area of the carrier is not limited, but is usually from 100 m$^2$/g to 1500 m$^2$/g, from 150 m$^2$/g to 1400 m$^2$/g in some embodiments, and from 180 m$^2$/g to 1300 m$^2$/g in some embodiments.

The specific surface area of the carrier in the range allows uniformly supporting the nanosized metal catalyst on the surface of the carrier and allows sufficiently ensuring reaction fields in electrodes described later.

The metal catalyst supported on the carrier is not limited as long as a catalytic action is exhibited in the reaction at the electrodes of the MEA.

Air electrode (cathode): $O_2+4H^++4e^-\rightarrow 2H_2O$
Fuel electrode (anode): $2H_2\rightarrow 4H^++4e^-$ The metal catalyst known in the technical field can be used. As the metal catalyst, while not limited, for example, platinum, a platinum alloy, palladium, rhodium, gold, argentum, osmium, iridium, or the like, or a mixture of them can be used. Examples of the platinum alloy include, for example, an alloy of platinum and at least one kind of aluminum, chromium, manganese, iron, cobalt, nickel, gallium, zirconium, molybdenum, ruthenium, rhodium, palladium, vanadium, tungsten, rhenium, osmium, iridium, titanium, or lead, for example, platinum cobalt. As the metal catalyst, the platinum cobalt is used in some embodiments.

The metal catalyst having a distribution in which the particle sizes are equal is used in some embodiments from aspects of the performance and the durability of the catalyst, and eventually the performance and the durability of the fuel cell.

Although the average particle size of the metal catalyst is not limited, as an average equivalent circle diameter of 100 particles in a TEM image(s), the average particle size of the metal catalyst is usually from 1 nm to 10 nm and from 2 nm to 5 nm in some embodiments.

The amount of the metal catalyst is, based on the total mass of the metal-supported catalyst, usually from 10 mass % to 80 mass % and from 15 mass % to 60 mass % in some embodiments.

Although not limited, the average particle size of the catalyst, for example, the metal-supported catalyst as an average equivalent circle diameter of 100 particles in a SEM image(s) is usually from 10 nm to 150 nm and from 15 nm to 100 nm in some embodiments.

The metal-supported catalyst can be manufactured by the method known in the technical field.

The amount of the catalyst, for example, the metal-supported catalyst is, based on the total mass of the catalyst ink, usually from 1 mass % to 20 mass % and from 3 mass % to 10 mass % in some embodiments.

The solvent is to disperse the catalyst and an ionomer described later, and the solvent known in the technical field can be used. The solvent includes, but not limited to, water, alcohol, for example, aliphatic alcohol (for example, methanol, ethanol, 1-propanol, 2-propanol), and the like, or a mixed solvent of them. As the solvent, the mixed solvent of water and alcohol, especially ethanol, is used in some embodiments. With the mixed solvent of water and alcohol, the water plays roles in the avoidance of ignition and the adsorption of the ionomer to the catalyst, and the alcohol plays a role in promoting wettability of the catalyst. The content of alcohol in the mixed solvent of water and alcohol is, based on the total mass of mixed solvent, usually from 30 mass % to 70 mass %, from 30 mass % to 50 mass % in some embodiments, and from 40 mass % to 50 mass % in some embodiments.

The ionomer contains a gel-like ionomer. The gel-like ionomer plays a role in adjustment of the viscosity in the catalyst ink. As the gel-like ionomer, the gel-like ionomer known in the technical field can be used, and the gel-like ionomer is not limited. The gel-like ionomer can be obtained by, for example, changing solvent species and a ratio of solid content in a solution-like ionomer described later, and heating, stirring, and gelatinizing the resultant. As the gel-like ionomer, a high oxygen permeable ionomer is used in some embodiments. Note that the high oxygen permeable ionomer means an ionomer having a structure that possibly becomes a steric hindrance in a construction of the ionomer, for example, the ionomer disclosed in JP 2003-036856 A.

The gel-like ionomer means an ionomer having a storage elastic modulus of 10 Pa or more when measured under the following conditions.

Measuring instrument: rheometer manufactured by Anton-Paar
Mode: viscoelasticity measurement
Diameter of parallel plate: 25 mm
Frequency: 1 kHz
Distortion: 1%

As the gel-like ionomer, the ionomer having the storage elastic modulus of 30 Pa or more to less than 700 Pa when measured under the above-described conditions is used in some embodiments.

In the method of the present disclosure, the ionomer contains the gel-like ionomer. Thus, the gel-like ionomer pulverized by the high-shear thin-film spin mixer plays not only the role as a viscosity modifier, but also a role as a dispersing agent of the fined catalyst, and therefore the content of the solution-like ionomer described later can be reduced, and further gas diffusivity of the catalyst layer can be improved.

The ionomer, in addition to the gel-like ionomer, can further contain a solution-like ionomer. As the solution-like ionomer, the solution-like ionomer known in the technical field can be used, and the solution-like ionomer is not limited. As the solution-like ionomer, for example, a fluorine ionomer can be used. As the commercial product, for example, Nafion (registered trademark) (manufactured by DuPont de Nemours, Inc.), Aciplex (registered trademark) (manufactured by Asahi Kasei Corporation), and FLEMION (registered trademark) (manufactured by AGC Inc.) can be used. As an ionic structure, a structure obtained by cleaving a double bond of a monomer having a carbon-carbon double bond which is, such as a Nafion (registered trademark) monomer and a Dow (registered trademark) monomer (short chain type) can be selected. Other non-ionic structures may be a chain structure or may be an annular structure. Specifically, a structure that can be obtained by cleaving a double bond of a monomer having a carbon-carbon double bond which is, such as polytetrafluoroethylene, polyhexafluoropropylene, perfluoropoly (ethyl vinyl ether), perfluoropoly (propyl vinyl ether), perfluoro(2,2-dimethyl-1,3-dioxole), perfluoro(2-methyl-1,3-dioxole), and perfluoro(1,3-dioxole) can be selected. As the solution-like ionomer, similarly to the gel-like ionomer, the high oxygen permeable ionomer can be used.

The solution-like ionomer means an ionomer having a storage elastic modulus of less than 10 Pa when measured under the following conditions.

Measuring instrument: rheometer manufactured by Anton-Paar
Mode: viscoelasticity measurement
Diameter of parallel plate: 25 mm
Frequency: 1 kHz
Distortion: 1%

As the solution-like ionomer, the ionomer having the storage elastic modulus of less than 5 Pa when measured under the above-described conditions is used in some embodiments.

The solution-like ionomer adsorbs to the carrier of the catalyst and also works as the dispersing agent. The dispersing agent adsorbs to the catalyst whose size has been decreased by mechanical crushing, and then exhibits an effect of stabilizing the particle size of the catalyst.

Although not limited, the content of the solution-like ionomer is, when the carbon in the catalyst is set to 100 pts.mass, usually from 0 pts.mass to 40 pts.mass, for example, from 0 pts.mass to 20 pts.mass, and from 5 pts.mass to 30 pts.mass in some embodiments.

The content of the whole ionomer (the gel-like ionomer+ the solution-like ionomer) is, when the carbon in the catalyst is set to 100 pts.mass, usually from 20 pts.mass to 100 pts.mass and from 50 pts.mass to 90 pts.mass in some embodiments.

The whole content of the ionomer within the range allows simultaneously performing (i) fineness of the catalyst and (ii) adjustment of the viscosity of the catalyst ink in the present disclosure.

As the raw material, in addition to the catalyst, the solvent, and the ionomer described above, the additive known in the technical field may be used. The additive that can be used as the raw material includes, but not limited to, a material that renders radicals, which are known as a substance that decomposes the electrolyte membrane, inactive, for example, a cerium ion source, for example, cerium nitrate.

The high-shear thin-film spin mixer that stirs and mixes the catalyst, the solvent, and the ionomer in the method of the present disclosure includes a cylindrical stirring tank, a rotary vane, and a shaft. The cylindrical stirring tank has unevennesses on the inner peripheral surface. The rotary vane is concentric with the stirring tank and has the outer diameter slightly smaller than the inner diameter of the stirring tank. The shaft includes the rotary vane on the end portion and is rotatable at high speed in forward and reverse directions.

Here, the order of addition of the catalyst, the solvent, and the ionomer in the stirring tank, the addition temperature, and the like are not limited, and the addition is performed by the method known in the technical field.

The high-shear thin-film spin mixer rotates the shaft at high speed to rotate the rotary vane at high speed. Thus, the raw materials (the catalyst+the solvent+the ionomer) introduced into the stirring tank are stirred while being rotated at high speed in a hollow cylindrical thin-film shape along the inner peripheral surface of the stirring tank, which is the surface perpendicular to the rotation direction of the rotary vane and has the unevennesses.

The stirring tank and the rotary vane in the high-shear thin-film spin mixer are made of metal, for example, made of stainless steel or made of nickel, or made of non-metal, for example, made of ceramic to avoid contamination of a metal to the raw materials.

The unevennesses on the inner peripheral surface of the stirring tank in the high-shear thin-film spin mixer include, for example, stripe-shaped grooves, grid-like grooves, or dimples, or a combination of them.

As the unevennesses on the inner peripheral surface of the stirring tank in the high-shear thin-film spin mixer, unevennesses in patterns different according to divided regions of the inner peripheral surface may be formed.

The unevennesses on the inner peripheral surface of the stirring tank in the high-shear thin-film spin mixer may be formed according to any of the whole configuration or a partial configuration of the outer peripheral surface of the rotary vane.

The pitch of the unevennesses on the inner peripheral surface of the stirring tank in the high-shear thin-film spin mixer may be at least one order of magnitude greater than the width or the depth of the unevennesses or both of them. For example, the unevennesses on the inner peripheral surface of the stirring tank are the stripe-shaped grooves, and the pitch of grooves (the width of projecting portions) is usually from 1 mm to 2 mm, the width of the grooves is usually from 100 µm to 300 µm, and the depth of the grooves is usually from 10 µm to 100 µm. For example, the unevennesses on the inner peripheral surface of the stirring tank are the grid-like grooves that intersect at the inclination of usually from 20 degrees to 40 degrees, for example, at 30 degrees, and the pitch of the grooves is usually from 1 mm to 2 mm, the width of the grooves is usually from 100 µm to 300 µm, and the depth of the grooves is usually from 10 µm to 100 µm. For example, the unevennesses on the inner peripheral surface of the stirring tank are the dimples in which holes are formed at parts corresponding to intersection points of grids that intersect at the inclination of usually from 20 degrees to 40 degrees, for example, at 30 degrees, and the size of the hole is usually from φ100 µm to 300 µm, the depth is usually from 10 µm to 100 µm, and the pitch is usually from 1 mm to 2 mm.

In the high-shear thin-film spin mixer, the rotary vane may include a porous cylindrical portion having a large number of penetrating small holes in the peripheral surface of the cylindrical body of the rotary vane at the outer peripheral surface, the rotary vane may be integrated with a boss by an arm(s) at the center of the porous cylindrical portion, and the rotary vane may be formed in a wheel shape.

The high-shear thin-film spin mixer may include an upper container that includes at least one discharge pipe via a barrier plate having an opening(s) on the stirring tank, and the barrier plate may be exchangeable with a barrier plate having a different opening(s).

In the high-shear thin-film spin mixer, the upper container and the stirring tank may be able to perform vacuum evacuation.

Figure 1:
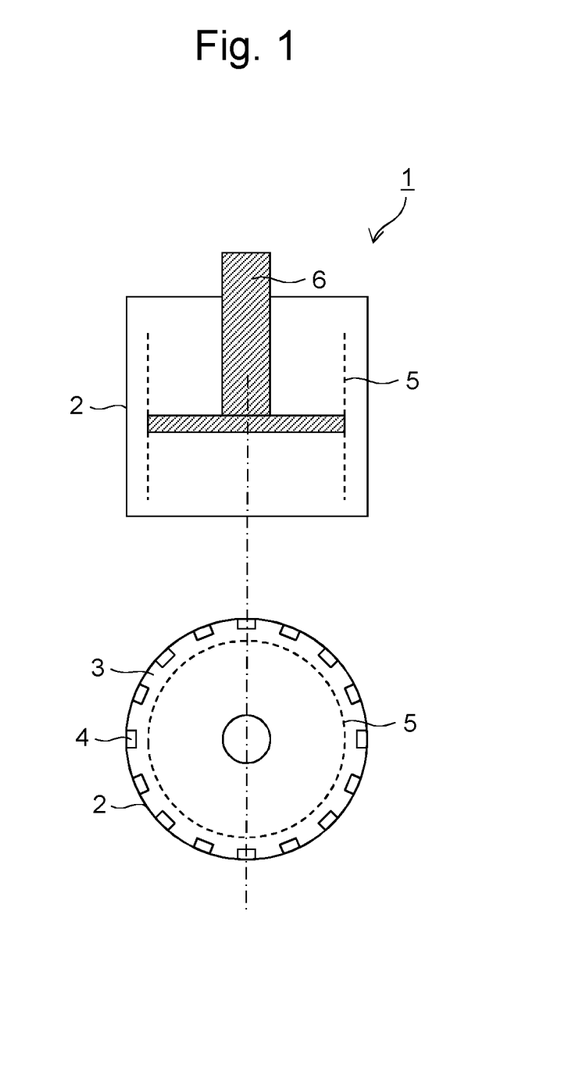
FIG. 1 is a diagram schematically illustrating an example of a high-shear thin-film spin mixer used for the present disclosure.

FIG. 1 schematically illustrates an example of the high-shear thin-film spin mixer used for the present disclosure. In FIG. 1, the high-shear thin-film spin mixer (1) includes the cylindrical stirring tank (2), the rotary vane (5), and the shaft (6). The cylindrical stirring tank (2) has the unevennesses (3, 4) on the inner peripheral surface. The rotary vane (5) is concentric with the stirring tank (2) and has the outer diameter slightly smaller than the inner diameter of the stirring tank (2). The shaft (6) includes the rotary vane (5) on the end portion and is rotatable at high speed in the forward and reverse directions.

As the high-shear thin-film spin mixer, for example, the high speed stirring device disclosed in JP 2007-125454 A can be used.

In the present disclosure, although not limited, the peripheral velocity of the rotary vane in the high-shear thin-film spin mixer is usually from 5 m/sec (second) to 50 m/sec and from 20 m/sec to 50 m/sec in some embodiments.

In the present disclosure, as the operating conditions of the high-shear thin-film spin mixer, the conditions known in the technical field can be used and the operating conditions are not limited. The high-shear thin-film spin mixer is performed, for example, usually at 20° C. to 60° C., 25° C. to 50° C. in some embodiments, and usually for one minute to 10 minutes and three minutes to eight minutes in some embodiments.

It is considered that by the use of the high-shear thin-film spin mixer to stir and mix the catalyst, the solvent, and the ionomer in the present disclosure, first, collision of these raw materials into the unevennesses formed on the stirring tank generates a turbulent flow, the turbulent flow causes cavitation, the cavitation generates an impact wave, the impact wave fines the hard catalyst so as to be finer than the mechanical clearances, and finally, not only the soft gel-like ionomer, but also the hard catalyst can be pulverized.

Additionally, in the present disclosure, since (i) fineness of the catalyst and (ii) adjustment of the viscosity of the catalyst ink can be simultaneously performed, the disperser to produce the catalyst ink can be single, thereby allowing reducing, for example, a cost of equipment, human work, and time that are probably required for production of the catalyst ink.

The method of the present disclosure may further include a step of separating coarse particles of the catalyst that cannot be fully fined and therefore are possibly contained in the catalyst ink by filtration, centrifuge, or the like (a coarse particle separation and removal step).

Addition of the coarse particle separation and removal step to the method of the present disclosure allows improving the performance and the durability of the catalyst layer and eventually the performance and the durability of the fuel cell.

The method of the present disclosure may further include a step of removing forms possibly contained in the catalyst ink by, for example, a defoaming machine (a defoaming step).

Addition of the defoaming step to the method of the present disclosure allows avoiding a pinhole and a cracking in the catalyst layer, and improving the performance and the durability of the catalyst layer and eventually the performance and the durability of the fuel cell.

Figure 2:
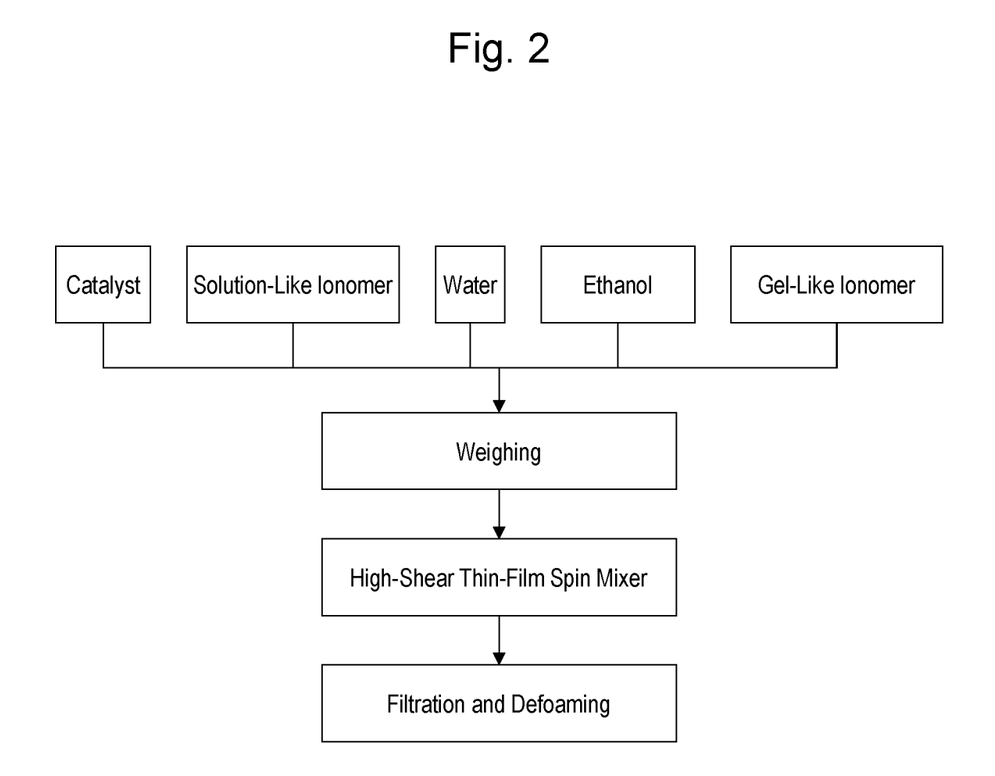
FIG. 2 is a diagram depicting an example of a method for manufacturing a catalyst ink of the present disclosure.

FIG. 2 illustrates an example of the method for manufacturing a catalyst ink of the present disclosure. In FIG. 2, first, the catalyst, the solution-like ionomer and the gel-like ionomer as the ionomer, and water and ethanol as the solvent, which are the raw materials of the catalyst ink, are weighed. Next, each of the weighed raw materials is put into the stirring tank of the high-shear thin-film spin mixer, and subsequently, the raw materials are stirred, mixed, and pulverized in the high-shear thin-film spin mixer, and in some cases, finally the filtration and the defoaming process are performed.

In the catalyst ink obtained by the present disclosure, the amount of solid content, that is, the ionomer (the gel-like ionomer+the solution-like ionomer) and the catalyst is, based on the total mass of the catalyst ink, usually from 5 mass % to 20 mass % and from 7 mass % to 15 mass % in some embodiments.

The particle size of the catalyst in the catalyst ink obtained by the present disclosure is fine in some embodiments but is not limited. When a volume-based particle size distribution is measured by laser diffraction scattering particle size distribution measurement method, D50 is usually from 0.1 μm to 2 μm and from 0.5 μm to 1 μm in some embodiments, and D90 is usually from 1 μm to 10 μm and from 2 μm to 8 μm in some embodiments.

The particle size of the catalyst in the catalyst ink within the range allows sufficiently ensuring the performance and the durability of the catalyst.

The viscosity of the catalyst ink obtained by the present disclosure is, when measured under the condition of the shear rate of 500 $s^{-1}$, usually from 2 mPa·s to 160 mPa·s and from 19 mPa·s to 98 mPa·s in some embodiments.

The viscosity of catalyst ink within the range allows easily applying the catalyst ink by die coating method (slot-die coating method).

The use of the catalyst ink obtained by the present disclosure further allows manufacturing a catalyst layer for fuel cell electrodes, for example, as follows by the method known in the technical field.

The catalyst ink obtained by the present disclosure is applied over a substrate that can be peeled, for example, a Teflon sheet at ordinary temperature by the known spraying/attachment/application method, especially the die coating method to form a catalyst layer precursor. The catalyst layer precursor is applied at a layer thickness such that the catalyst layer for fuel cell electrodes has a layer thickness of usually from 60 μm to 200 The catalyst layer precursor on the substrate is dried at usually from 60° C. to 150° C. and usually for 30 seconds to 0.5 hours by the known drying method, for example, by the use of a fan dryer to remove a volatile substance, such as a solvent, the catalyst layer is prepared, and the catalyst layer is peeled from the substrate to obtain the catalyst layer.

Here, in the above description, the catalyst ink is sprayed, attached, and/or applied over the substrate, and afterwards the catalyst ink is dried and peeled to obtain the catalyst layer. However, the catalyst ink is directly sprayed, attached, and/or applied over the surface of the solid polymer electrolyte membrane, such as a Nafion membrane, and after that the catalyst ink is dried to allow preparation in which the catalyst layer and the solid polymer electrolyte membrane are assembled.

When the catalyst layer for fuel cell electrodes is manufactured using the catalyst ink obtained by the present disclosure, the solid content of the catalyst ink can be increased, and therefore a drying load during drying the catalyst ink is reduced. Additionally, by the solid content in the catalyst ink and the appropriate viscosity of catalyst ink, both of avoiding a cracking of the surface of the catalyst layer and ease of intermittent coating from the ink state are achieved.

The obtained catalyst layer for fuel cell electrodes can be used as an air electrode and/or a fuel electrode contained in the MEAS of various electrochemical devices, such as a solid polymer fuel cell.

Furthermore, using the obtained catalyst layer for fuel cell electrodes, for example, the MEA can be prepared as follows.

Using the obtained catalyst layer for fuel cell electrodes as the air electrode and/or the fuel electrode, the air electrode is disposed on one surface and the fuel electrode is disposed on the other surface with the solid polymer electrolyte membrane interposed therebetween to obtain a layer assembly. Here, by changing the metal catalyst used or the like, the air electrode and the fuel electrode are prepared so as to adjust to each of the electrodes. The layer assembly disposed like the air electrode–the solid polymer electrolyte membrane–the fuel electrode described above is press-bonded with a hot press at usually from 100° C. to 200° C. and usually a pressure of 1 MPa to 10 MPa for usually from 50 seconds to 600 seconds to obtain the MEA.

The fuel cell finally manufactured using the catalyst ink obtained by the present disclosure has improved battery performance as various electrochemical devices, such as the solid polymer fuel cell.

EXAMPLES

While the following describes some Examples regarding the present disclosure, it is not intended to limit the present disclosure to those described in such Examples.

1. Preparation of Catalyst Ink

Comparative Example 1

Figure 3:
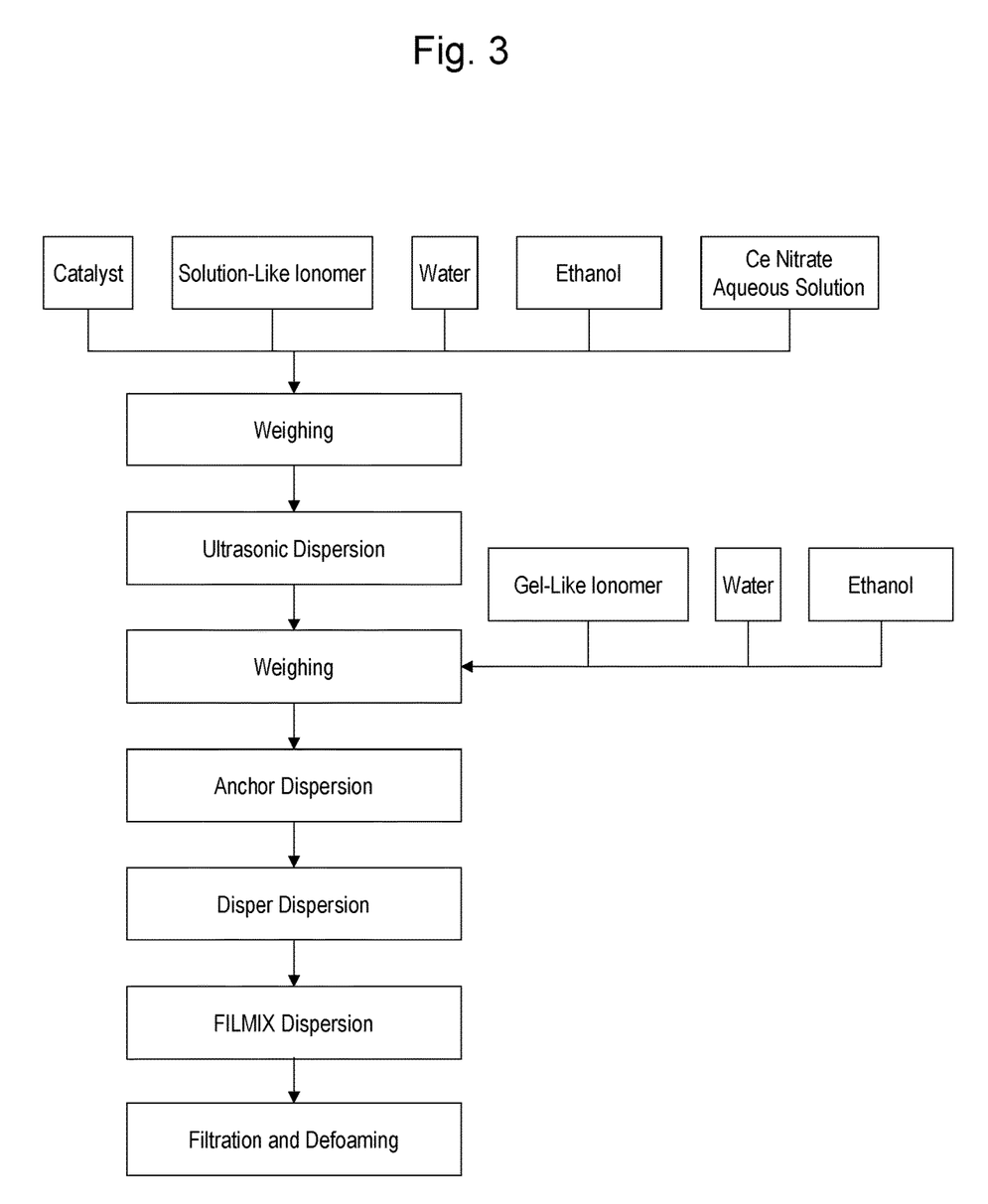
FIG. 3 is a diagram depicting a method for manufacturing catalyst inks of comparative examples.

The catalyst ink was prepared in accordance with the conventional method for manufacturing a catalyst ink depicted in FIG. 3.

(i) In a container, as raw materials, a catalyst in which a platinum cobalt alloy (platinum 45.0 mass % and cobalt 2.3 mass % based on the total mass of the catalyst) was supported on an acetylene black type carbon black (the specific surface area: about 300 $m^2/g$) as a catalyst, water and ethanol (ethanol 30 mass % based on the total mass of the mixed solvent) as a solvent, a solution-like ionomer (30 pts.mass based on 100 pts.mass of the acetylene black type carbon black) as a dispersing agent, and a cerium nitrate aqueous solution as an additive were weighed and put. Dispersion was performed by ultrasonic homogenizer (when irradiating at the output of 600 W and 20 kHz for 75 seconds, stopping the irradiation, and cooling for 120 seconds were set to one cycle, 10 cycles were performed, ultrasonic dispersion).

Comparative Example 2

Except that the additive amount of the solution-like ionomer as the dispersing agent in the step (i) in Comparative Example 1 was changed from "30 pts.mass based on 100 pts.mass of the acetylene black type carbon black" to "20 pts.mass based on 100 pts.mass of the acetylene black type carbon black," the catalyst ink was prepared similarly to Comparative Example 1.

Comparative Example 3

Except that the additive amount of the solution-like ionomer as the dispersing agent in the step (i) in Comparative Example 1 was changed from "30 pts.mass based on 100 pts.mass of the acetylene black type carbon black" to "10 pts.mass based on 100 pts.mass of the acetylene black type carbon black," the catalyst ink was prepared similarly to Comparative Example 1.

Comparative Example 4

Except that the "acetylene black type carbon black (the specific surface area: about 300 $m^2/g$)" in the catalyst in Comparative Example 1 was changed to "the carrier in which the Ketjen was fired at high temperature and then crystallinity thereof was improved (the specific surface area: about 180 $m^2/g$)," the catalyst ink was prepared similarly to Comparative Example 1.

Table 1 summarizes the I/C (the mass of ionomer/the mass of carrier in the catalyst (the mass of carbon black)) of the catalyst inks of Comparative Examples 1 to 3.

TABLE 1

| Sample | Catalyst Species | I/C Before Ultrasonic Dispersion* (Proportion of Solution-like Ionomer Based on Whole Ionomer) | I/C Before FILMIX Dispersion** (Proportion of Gel-Like Ionomer Based on Whole Ionomer) | Total I/C*** |
|---|---|---|---|---|
| Comparative Example 1 | Pt: 45.0 Mass % Co: 2.3 Mass % | 0.3 (42.9%) | 0.4 (57.1%) | 0.70 |
| Comparative Example 2 | Activated Carbon Black | 0.2 (28.6%) | 0.5 (71.4%) | 0.70 |
| Comparative Example 3 | | 0.1 (14.3%) | 0.6 (85.7%) | 0.70 |

*I/C = Mass of Solution-like Ionomer/Mass of Carbon Black
**I/C = Mass of Gel-Like Ionomer/Mass of Carbon Black
***I/C = (Mass of Solution-like Ionomer + Gel-Like Ionomer)/Mass of Carbon Black (ii) Next, into the dispersion liquid obtained in (i), a solution containing water and ethanol (ethanol 37 mass % based on the total mass of the mixed solvent) as the solvent and a gel-like ionomer for adjustment of viscosity (whose content was adjusted such that the content of the whole ionomer (the solution-like ionomer+the gel-like ionomer) was 70 pts.mass based on 100 pts.mass of the acetylene black type carbon black) was weighed and put. After an anchor dispersion and a disper dispersion, dispersion was performed by a thin-film spin mixer (FILMIX manufactured by PRIMIX Corporation) (at a peripheral velocity of 30 m/s for 180 seconds, FILMIX dispersion) to prepare a catalyst ink (solid content 10 mass % based on the total mass of the catalyst ink).

Example 1

Figure 4:
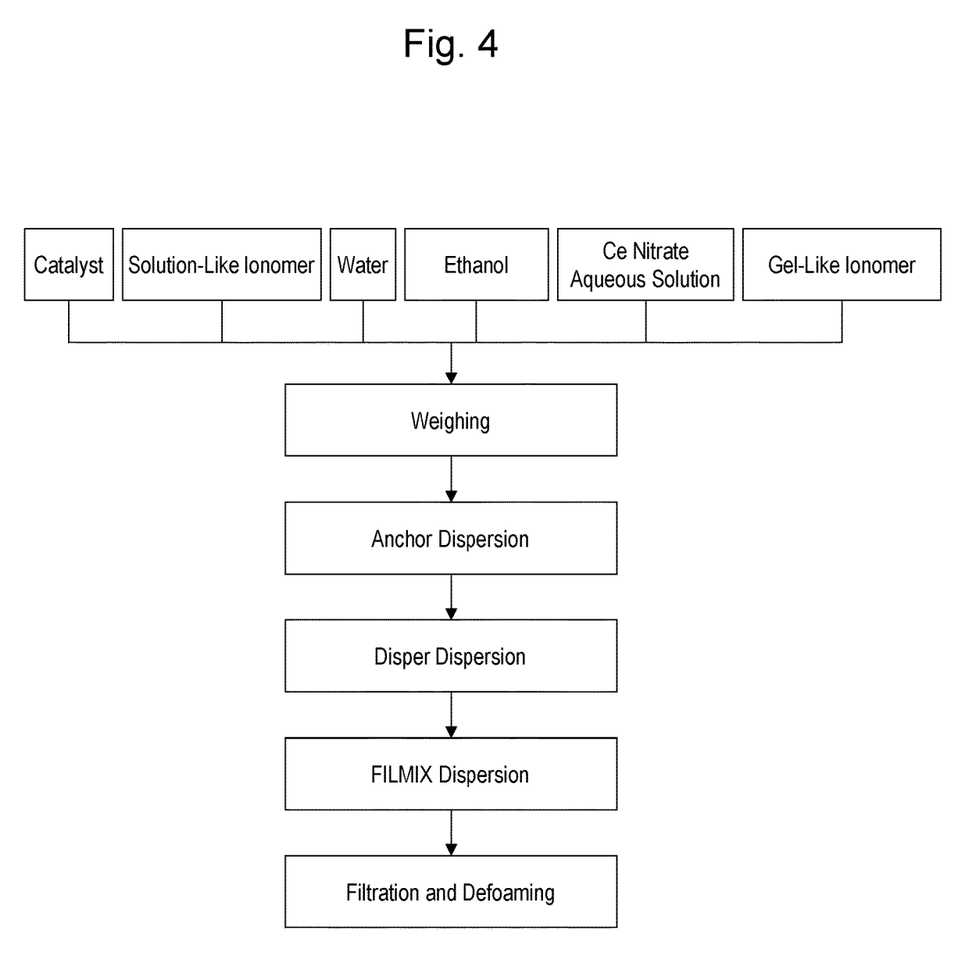
FIG. 4 is a diagram depicting a method for manufacturing catalyst inks of examples.

The catalyst ink was prepared in accordance with the method for manufacturing a catalyst ink depicted in FIG. 4.

In a stirring tank having unevennesses by groove process on an inner peripheral surface (the unevennesses: stripe-shaped grooves, the pitch of grooves: 1.5 mm, the width of groove: 200 µm, and the depth of groove: 50 µm), as raw materials, a catalyst in which a platinum cobalt alloy (platinum 45.0 mass % and cobalt 2.3 mass % based on the total mass of the catalyst) was supported on an acetylene black type carbon black (the specific surface area: about 300 $m^2/g$) as a catalyst, water and ethanol (ethanol 37 mass % based on the total mass of the mixed solvent) as a solvent, a solution-like ionomer (20 pts.mass based on 100 pts.mass of the acetylene black type carbon black) as a dispersing agent, a gel-like ionomer for adjustment of viscosity (whose content was adjusted such that the content of the whole ionomer (the solution-like ionomer+the gel-like ionomer) was 70 pts.mass based on 100 pts.mass of the acetylene black type carbon black), and cerium nitrate as an additive were weighed and put. After the anchor dispersion and the disper dispersion, dispersion was performed by a thin-film spin mixer (FILMIX manufactured by PRIMIX Corporation, the high-shear thin-film spin mixer having unevennesses by groove process on the inner peripheral surface of the stirring tank) (at a peripheral velocity of 30 m/s for 180 seconds, improved FILMIX dispersion) to prepare a catalyst ink (solid content 10 mass % based on the total mass of the catalyst ink).

Example 2

Except that the additive amount of the solution-like ionomer as the dispersing agent in Example 1 was changed from "20 pts.mass based on 100 pts.mass of the acetylene black type carbon black" to "10 pts.mass based on 100 pts.mass of the acetylene black type carbon black," the catalyst ink was prepared similarly to Example 1.

Example 3

Except that "the acetylene black type carbon black (the specific surface area: about 300 m²/g)" in the catalyst in Example 1 was changed to "the carrier in which the Ketjen was fired at high temperature and then crystallinity thereof was improved (the specific surface area: about 180 m²/g)," the catalyst ink was prepared similarly to Example 1.

Table 2 summarizes the I/C (the mass of ionomer/the mass of carrier in the catalyst (the mass of carbon black)) of the catalyst inks of Examples 1 and 2.

TABLE 2

| Sample | Catalyst Species | I/C* (Proportion of Solution-like Ionomer Based on Whole Ionomer) | I/C** (Proportion of Gel-Like Ionomer Based on Whole Ionomer) | Total I/C*** |
|---|---|---|---|---|
| Example 1 | Pt: 45.0 Mass % Co: 2.3 Mass % | 0.2 (28.6%) | 0.5 (71.4%) | 0.70 |
| Example 2 | Activated Carbon Black | 0.1 (14.3%) | 0.6 (85.7%) | 0.70 |

*I/C = Mass of Solution-like Ionomer/Mass of Carbon Black
**I/C = Mass of Gel-Like Ionomer/Mass of Carbon Black
***I/C = (Mass of Solution-like Ionomer + Gel-Like Ionomer)/Mass of Carbon Black 2. Evaluation for Catalyst Ink The volume-based particle size distributions of the catalysts in the catalyst inks of Comparative Examples 1 to 4 and Examples 1 to 3 were measured by laser diffraction scattering particle size distribution measurement method.

Figure 5:
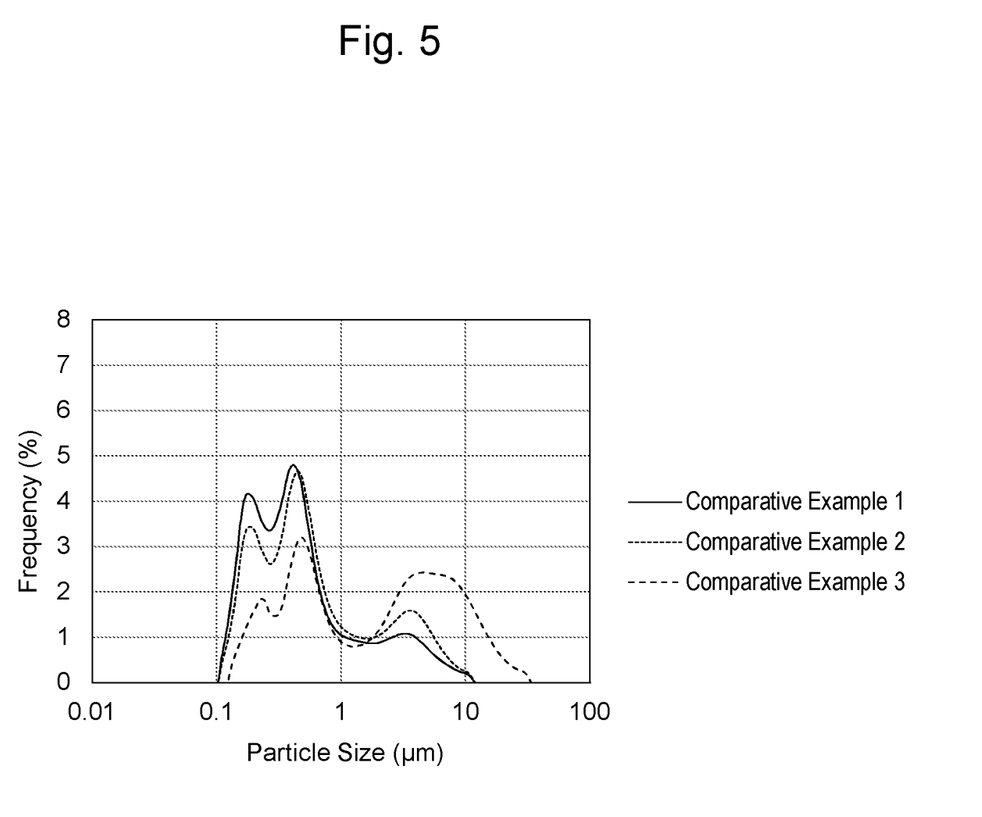
FIG. 5 is a graph illustrating a relationship between particle sizes and a frequency thereof for catalysts in catalyst inks of Comparative Examples 1 to 3.
Figure 6:
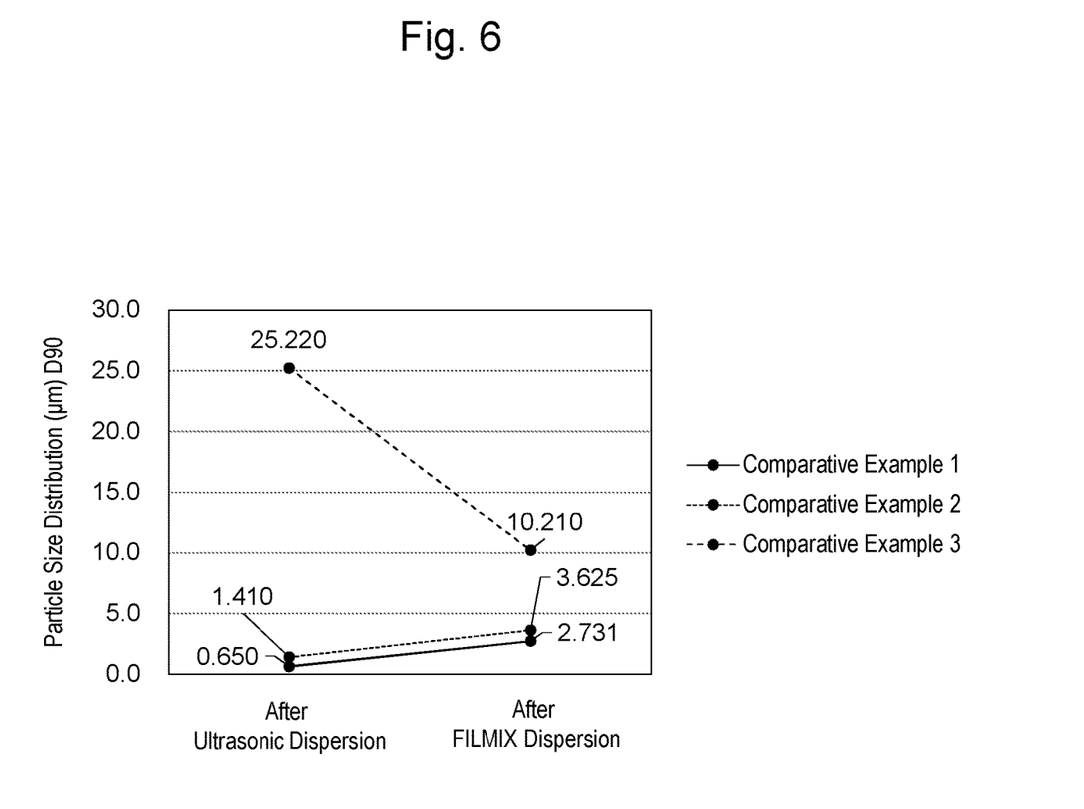
FIG. 6 is a graph illustrating values of particle size D90 in particle size distributions after ultrasonic dispersion and after FILMIX dispersion in the catalyst inks of Comparative Examples 1 to 3.

FIG. 5 illustrates the relationship between the particle sizes and the frequency thereof for the catalysts in the catalyst inks of Comparative Examples 1 to 3, and FIG. 6 illustrates values of the particle size D90 in the particle size distributions after the ultrasonic dispersion and after the FILMIX dispersion in the catalyst inks of Comparative Examples 1 to 3.

From FIG. 5 and FIG. 6, the particle size D90 as the reference of coarse particles became less than 3.0 µm only in Comparative Example 1 among the catalyst inks of Comparative Examples 1 to 3.

Additionally, in Comparative Example 4 as well, D90 became 3.0 µm or more (4.90 µm, 3.91 µm, and 3.56 µm (N=3)).

Figure 7:
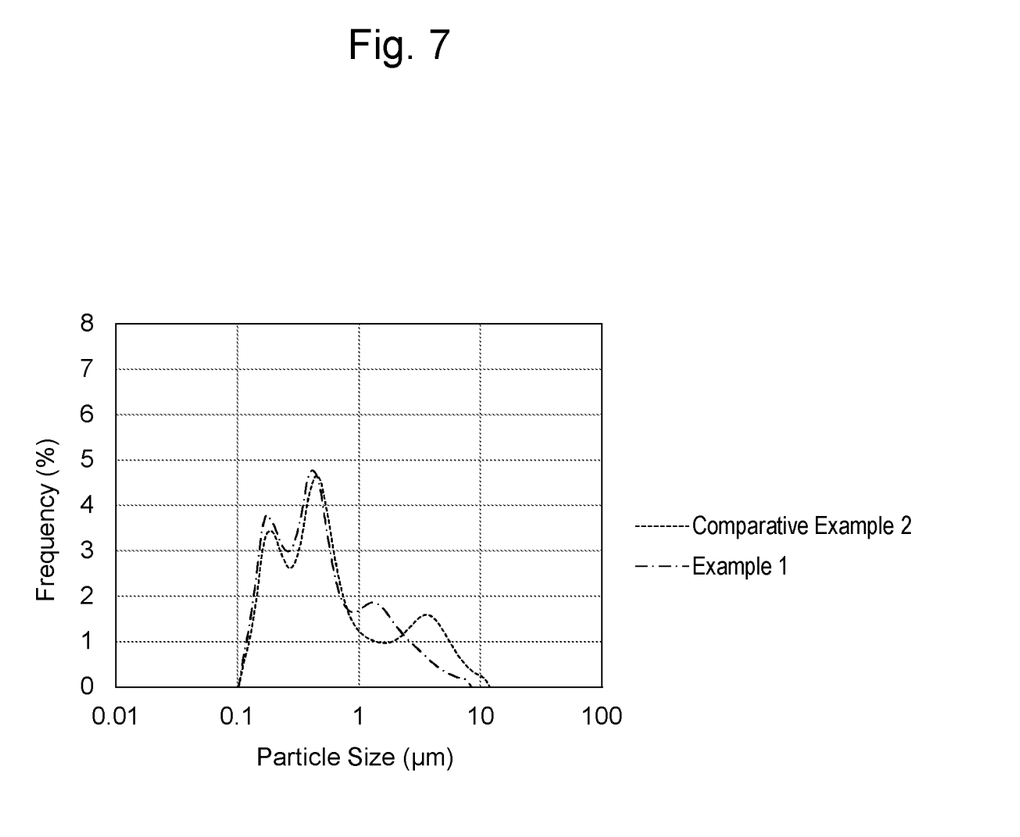
FIG. 7 is a graph illustrating a relationship between particle sizes and a frequency thereof for catalysts in catalyst inks of Comparative Example 2 and Example 1.
Figure 8:
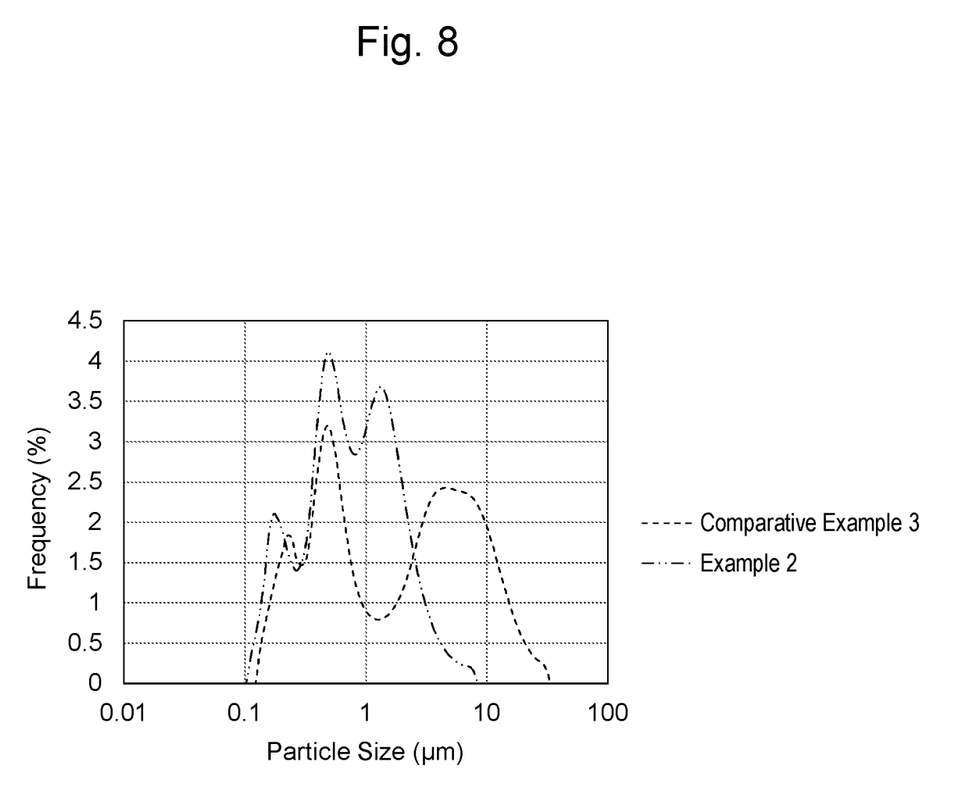
FIG. 8 is a graph illustrating a relationship between particle sizes and a frequency thereof for catalysts in catalyst inks of Comparative Example 3 and Example 2.

Next, FIG. 7 illustrates the relationship between the particle sizes and the frequency thereof for the catalysts in the catalyst inks of Comparative Example 2 and Example 1, and FIG. 8 illustrates the relationship between the particle sizes and the frequency thereof for the catalysts in the catalyst inks of Comparative Example 3 and Example 2. Note that the I/C of the solution-like ionomer and the I/C of the gel-like ionomer in the catalyst ink of Comparative Example 2 are same as those of Example 1. Similarly, the I/C of the solution-like ionomer and the I/C of the gel-like ionomer in the catalyst ink of Comparative Example 3 are same as those of Example 2.

From FIG. 7 and FIG. 8, the particle size D90 as the reference of coarse particles became less than 3.0 µm in both of Examples 1 and 2 (Example 1: 2.05 µm, Example 2: 2.15

Additionally, D90 was 1.90 µm also in Example 3.

All publications, patents and patent applications cited in the present description are herein incorporated by reference as they are.

What is claimed is:

1. A method for manufacturing a catalyst ink for fuel cell electrodes containing a catalyst, a solvent, and an ionomer, the method comprising
    stirring and mixing the catalyst, the solvent, and the ionomer by a high-shear thin-film spin mixer,
    wherein the ionomer contains a solution-like ionomer and a gel-like ionomer, which is an ionomer having a structure that becomes a steric hindrance in a construction of the ionomer, and
    wherein the catalyst contains a carbon;
    wherein a content of the solution-like ionomer is from 5 mass % to 20 mass % when a content of the carbon in the catalyst is defined as 100 mass %,
    wherein a content of a whole ionomer is from 50 mass % to 90 mass % when the carbon in the catalyst is set to 100 mass %,
    wherein the high-shear thin-film spin mixer includes a cylindrical stirring tank, a rotary vane, and a shaft, the cylindrical stirring tank having unevennesses on an inner peripheral surface thereof, the rotary vane being concentric with the stirring tank and having an outer diameter slightly smaller than an inner diameter of the stirring tank, and the shaft including the rotary vane on an end portion thereof and being rotatable at high speed in forward and reverse directions.

2. The method according to claim 1,
    wherein the gel-like ionomer has oxygen permeability above a predetermined threshold.

3. A method for manufacturing a fuel cell comprising
applying a catalyst ink for fuel cell electrodes obtained by the method according to claim 1 over a solid polymer electrolyte by a die coating method to form a fuel cell electrode.

\* \* \* \* \*